Sept. 16, 1958 P. R. HELLER 2,852,319
THRUST BEARING
Filed Sept. 9, 1944
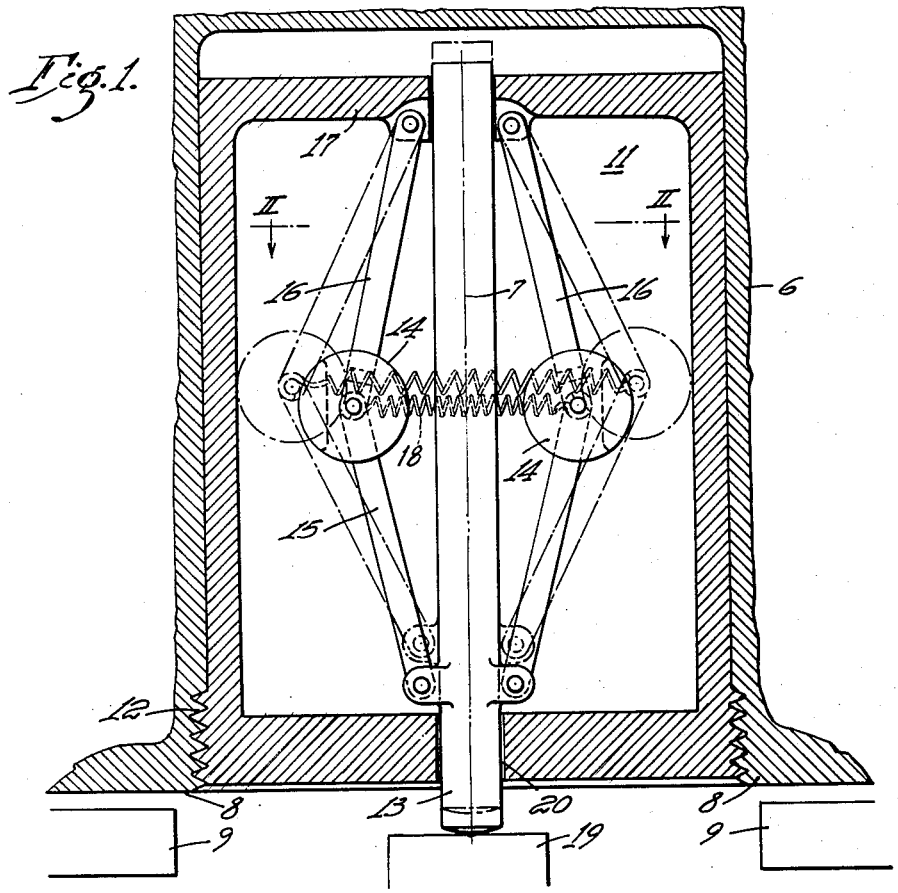
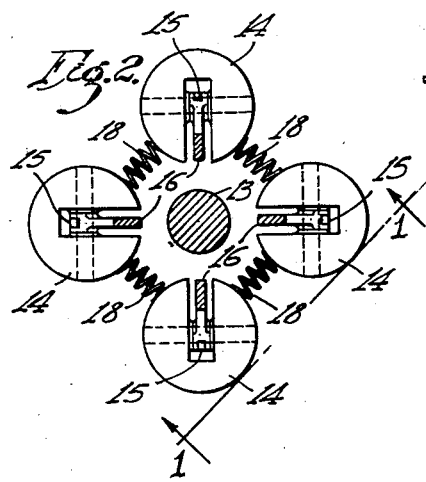
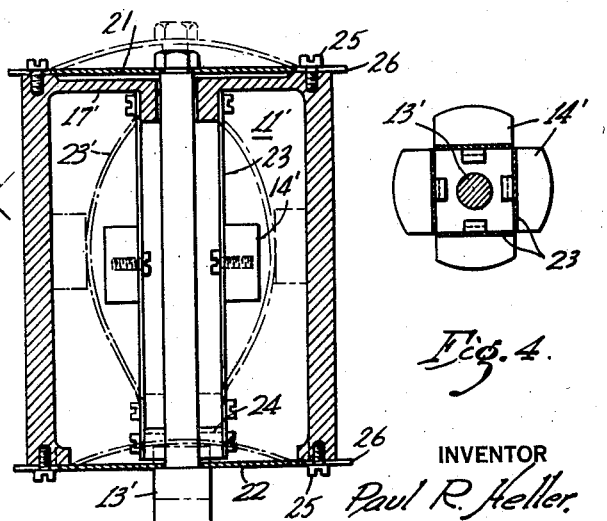
INVENTOR
Paul R. Heller
BY
ATTORNEY

United States Patent Office 2,852,319
Patented Sept. 16, 1958

2,852,319

THRUST BEARING

Paul R. Heller, Irwin, Pa., assignor, by mesne assignments, to the United States of America as represented by the United States Atomic Energy Commission Application September 9, 1944, Serial No. 553,453

6 Claims. (Cl. 308—139)

My invention relates to a centrifugal jack which is adapted to take the thrust off of a regularly operative thrust-bearing during starting and stopping, and at low speeds of a rotor-member. A particular advantage of my invention is that it makes possible the utilization of regularly operative, broad surfaced, thrust-bearings, of a type lubricated by a fluid having a viscosity of the same order as, or lower than, the viscosity of water, by which I mean to include such low-viscosity fluids as gases, water, gasoline, a refrigerating fluid, or other ambient medium surrounding the regularly operative thrust-bearing, which may be a part of a vertical-shaft electric motor, pumping a gas of any density, or pumping a low-viscosity liquid.

My invention is particularly adapted for those designs involving a vertical load, such as the weight of a rotor, a blower, or the like, on a broad-surfaced thrust-bearing of a type having good lubrication during normal full-speed operation, but subject to excessive friction and bearing-seizure difficulties at starting and during slow speed-operation. The high friction-torque of such a thrust-bearing is frequently too high to be overcome by the starting-torque of the motor. Furthermore, such a bearing is subject to bearing-seizure, both during the low-speed period of the starting-cycle, and frequently also during the low-speed portion of the stopping-cycle if an effort is made to stop the machine with full load on the thrust-bearing.

The principal object of my present invention is to provide an automatic speed-responsive means for lifting the load from the regularly operative thrust-bearing during the starting and stopping cycles.

With the foregoing and other objects in view, my invention consists in the apparatus, systems, methods, combinations, parts and structure hereinafter described and claimed, and illustrated in the accompanying drawing, wherein:

Figure 1 is a diagrammatic vertical section view showing one form of embodiment of my invention, Fig. 2 is a diagrammatic horizontal plan view of the weight-members of Fig. 1, but rotated to a position which is displaced 45° with respect to the view in Fig. 1.

Fig. 3 is a diagrammatic vertical sectional view illustrating a modification of the centrifugal element, and Fig. 4 is a diagrammatic horizontal plan view of the weight-members of Fig. 3.

In Fig. 1, I have diagrammatically indicated a vertical-shaft machine having a rotor-member 6 which is adapted to rotate about a vertical axis 7, and having a vertical axial thrust which is normally sustained by a broad-surfaced thrust-bearing consisting of a rotor-carried runner 8 which is adapted to rest upon thrust-supporting bearing-shoes 9. This broad-surfaced thrust-bearing 8—9 could be an ordinary oil-lubricated thrust-bearing, but my invention is primarily adapted for small motors which are intended to be operated in such places or under such conditions that oil-lubrication cannot conveniently be provided, and hence I contemplate the use of low-viscosity fluids, preferably gases, as a lubricant for the normally operated thrust-bearing 8—9. Any low-viscosity fluid could be utilized, either gaseous or liquid, having a viscosity which is so low as to cause the thrust-bearing 8—9 to be subject to excessive friction and bearing-seizure difficulties at starting and during slow-speed operation, while providing good lubrication during normal full-speed operation. In general, all such low-viscosity fluids will have a viscosity of the same order as, or lower than, the viscosity of water.

In accordance with my invention, as shown in Fig. 1, I equip such a rotor-member 6 with a centrifugal, or other speed-responsive, jack 11, which is carried by the rotor-member 6, as by being screw-threadedly secured thereto as indicated at 12. The jack 11 of Fig. 1 is provided with a downwardly extending, axially located thrust-pin 13, which is controlled by a centrifugal device comprising a plurality of weights 14 which are joined, by suitable links 15 and 16, to the thrust-pin 13 and a rotor-mounted support 17, respectively, in such manner as to cause the thrust-pin 13 to move axially when the weights 14 move radially inwardly and outwardly with respect to the axis of rotation 7. As shown in Fig. 1, the weights 14 are joined to each other by a suitable spring or springs serving as a garter-spring 18 or other spring-means for normally causing the weights to move to a position relatively close to the shaft-axis 7.

At standstill, and at low speeds of the rotor-member 6, the garter-spring 18 draws the balls 14 inwardly, which thrusts the thrust-pin 13 downwardly, so that its bottom end rests upon a stop 19 and raises the entire rotor-member so that the runner 8 is out of contact with the thrust-bearing supporting-shoes 9. The bottom end of the thrust pin 13 makes a small surfaced contact with the top of the stop 19, and this contact offers only a small friction, both because of its small size and because it is located at substantially the axis of rotation 7. Such a contact would not stand long service, or service at high speeds, but it can be used long enough to permit the rotor-member 6 to attain a certain predetermined speed.

When the rotor-member 6 attains a speed for which the centrifugal member 11 is adjusted, the centrifugal force on the weights 14, aided by the thrust or weight which is sustained by the thrust-pin 13, forces the balls 14 outwardly, against the tension of the garter-spring 18, and draws the thrust-pin 13 axially upwardly, as shown in dot-and-dash lines in Fig. 1, letting down the rotor-member 6 until the runner 8 rests on the bearing-shoes 9. The thrust-pin thereupon continues to move upwardly until the centrifugal weights 14 reach the outer limit of their outward radial movement, meanwhile withdrawing the thrust-pin completely out of contact with the stop 19. In this manner, the thrust is transferred from the small-surfaced thrust-pin 13 to the broad-surfaced thrust-bearing 8—9.

During the stopping cycle, the reverse of the above operation occurs, thus raising the thrust-load from the broad-surfaced thrust-bearing 8—9. These operations are entirely automatic, responsive to the speed of the rotor-member 6, and this is a very considerable advantage, for while it would be possible to provide means whereby the operator could take precautions in regard to intentional startings and stoppings of the apparatus, such precautions would not be available during unintentional or emergency shutdowns due to power-failure.

I am not limited to any particular type of speed-responsive mechanism. The speed-responsive or centrifugal device 11 which is shown in Fig. 1 is of an articulated type, in which the links 15 and 16 are pivoted or articulated at their respective ends. This type of centrifugal device can be readily designed for fairly heavy loads, but it has the disadvantage of involving a possible binding of ordinary pivots and guides, if the device is called upon to operate in a corrosive medium.

In Figs. 3 and 4, I have shown an elastically mounted, non-articulated, type of centrifugal mechanism 11', in which the thrust-pin 13', instead of passing down through a hole 20 in the bottom of the rotor-mounted housing 17, as in Fig. 1, is rigidly mounted between two crosswise or radially extending springs 21 and 22, which are connected respectively to the top and bottom of the thrust-pin 13' as shown in Fig. 3. The springs 21 and 22 are slidably connected to the rotor-carried support-member 17' by means of screws 25 through slots 26 in the ends of springs 21 and 22. The weights 14' in Fig. 3, are mounted at intermediate points of a plurality of springs 23, the top ends of which are connected to the rotor-carried support-member 17', while the bottom ends of the springs 23 are secured to the thrust-pin 13' at 24. The springs 23 in Fig. 3 thus take the place of both the linkage 15—16 and the garter-spring 18 of Fig. 1.

In operation, the springs 23 of Fig. 3 are biased so as to normally move the weights 14' as far inwardly as they will go, thus straightening out the springs 23 and thrusting the thrust-pin 13' downwardly. When a certain predetermined rotor-speed is reached, the weights 14' fly out, flexing the springs 23 as indicated at 23', drawing up the thrust-pin 13' by flexing the bottom cross-spring 22. This non-articulated design thus lends itself admirably for use in corrosive media, and it provides adequate strength for moderately light thrust-loads or rotor-weights.

The invention in its broader aspects is not limited to the specific mechanisms shown and described but departures may be made therefrom within the scope of the accompanying claims without departing from the principles of the invention and without sacrificing its chief advantages.

I claim as my invention:

1. Thrust bearing means for a rotatable member comprising, in combination, relatively large and small faced bearing surfaces on said member, said small faced surface being relatively axially movable with respect to said other surface into and out of supporting engagement with a load, and means responsive to the speed of rotation of said member for automatically axially moving said small faced surface to shift the load from one bearing surface to the other in response to changes in the rotational speed of the member, said means comprising a pin carrying said small faced surface, said pin being axially slidably mounted on said member, and centrifugal means, connected to said pin and said member, for causing said pin to be moved axially in one direction by centrifugal force upon rotation of said member, said centrifugal means comprising a plurality of weights, and pivotal linkage connected to said weights and having its linkage-terminals connected to said pin and said member in such manner that the weights move radially outwardly by centrifugal force, and in so moving, draw the linkage-terminals together, and spring means interconnecting said weights for biasing said pin axially in the opposite direction.

2. Thrust bearing means for a rotatable member comprising, in combination, relatively large and small faced bearing surfaces on said member, said small faced surface being relatively axially movable with respect to said other surface into and out of supporting engagement with a load, and means responsive to the speed of rotation of said member for automatically axially moving said small faced surface to shift the load from one bearing surface to the other in response to changes in the rotational speed of the member, said means comprising a pin carrying said small faced surface, guide-means for supporting said pin on said member in such manner as to permit axial movement of said pin with respect to said member, a plurality of leaf-spring elements interconnecting said member and said pin, said leaf-spring elements being disposed in a generally rectilinear and axial direction at low speeds, and weights intermediately disposed on said leaf-spring elements whereby said pin is axially moved by centrifugal force upon rotation of said member.

3. Thrust bearing means for a rotatable member comprising, in combination, two thrust-surface members, carried by said rotatable member and rotating therewith, for providing large-area and small-area thrust-bearing surfaces, respectively, arranged to move into and out of supporting engagement with a load in response to the speed of the rotatable member, means for guidably supporting at least one of said thrust-surface members so that it is axially movable with respect to said rotatable member, whereby said large-area and small-area thrust-bearing surfaces are relatively axially movable, relatively to each other, and speed-responsive mechanism, responsive to the speed of rotation of said rotatable member, for automatically shifting the axial relationship of said thrust-bearing surfaces, to shift the load from one thrust-bearing surface to the other in response to changes in the speed of the rotatable member, said speed-responsive mechanism comprising a plurality of centrifugal weights, a pair of linkage-means for each centrifugal weight, each linkage-means being disposed generally rectilinearly and axially at low speeds, one linkage-means of each pair connecting its centrifugal weight to the rotatable member, and the other linkage-means of each pair connecting its weight to said one of said thrust-surface members, and said speed-responsive mechanism comprising spring-means for opposing the centrifugal force on the weights.

4. Thrust bearing means for a rotatable member comprising, in combination, two thrust-surface members, carried by said rotatable member and rotating therewith, for providing large-area and small-area thrust-bearing surfaces, respectively, arranged to move into and out of supporting engagement with a load in response to the speed of the rotatable member, means for guideably supporting at least one of said thrust-surface members so that it is axially movable with respect to said rotatable member, whereby said large-area and small-area thrust-bearing surfaces are relatively axially movable, relatively to each other, and speed-responsive mechanism, responsive to the speed of rotation of said rotatable member, for automatically shifting the axial relationship of said thrust-bearing surfaces, to shift the load from one thrust-bearing surface to the other in response to changes in the speed of the rotatable member, said speed-responsive mechanism comprising a plurality of centrifugal weights, a plurality of pairs of links, each disposed generally axially at low speeds, and each pivotally connected to a weight, one link of each pair being pivotally connected to the rotatable member, and the other being pivotally connected to said one of said thrust-surface members, whereby said one of said thrust-surface members is moved axially, in one direction, by centrifugal force upon rotation of said rotatable member, and spring-means interconnecting said weights and biasing said one of said thrust-surface members in the opposite direction.

5. Thrust bearing means for a rotatable member comprising, in combination, two thrust-surface members, carried by said rotatable member and rotating therewith, for providing large-area and small-area thrust-bearing surfaces, respectively, arranged to move into and out of supporting engagement with a load in response to the speed of the rotatable member, means for guidably supporting at least one of said thrust-surface members so that it is axially movable with respect to said rotatable member, whereby said large-area and small-area thrust-bearing surfaces are relatively axially movable, relatively to each other, and speed-responsive mechanism, responsive to the speed of rotation of said rotatable member, for automatically shifting the axial relationship of said thrust-bearing surfaces, to shift the load from one thrust-bearing surface to the other in response to changes in the speed of the rotatable member, said speed-responsive mechanism comprising a plurality of leaf-spring elements, disposed generally rectilinearly and axially at low speeds, interconnecting said movable member and said one of said thrust-surface members, and weights intermediately secured to said leaf-spring elements whereby said one of said thrust-surface members is axially moved by centrifugal force upon rotation of said rotatable member.

6. Thrust bearing means for a rotatable member comprising, in combination, relatively large and small faced thrust bearing surfaces on said member, said surfaces being relatively axially movable into and out of supporting engagement with a load, and means responsive to the speed of rotation of said member for automatically shifting the axial relationship of the bearing surfaces whereby the load is shifted from one bearing surface to the other in response to changes in the rotational speed of the member, said means comprising a retractable pin carrying one of said surfaces, said pin being secured to the rotating member so as to permit axial movement of the pin relative to the rotating member, spring means biasing the pin in one axial direction, and a weight flexibly secured both to the spring means and to the rotatable member for moving the pin in the opposite axial direction in response to centrifugal force.

References Cited in the file of this patent

UNITED STATES PATENTS

| | | |
|---|---|---|
| 348,998 | Place | Sept. 14, 1886 |
| 377,028 | Horton | Jan. 31, 1888 |
| 1,026,041 | Kimball | May 14, 1912 |
| 1,121,083 | De Ferranti | Dec. 15, 1914 |
| 1,734,273 | Schein | Nov. 5, 1929 |

FOREIGN PATENTS

| | | |
|---|---|---|
| 341,146 | Germany | Sept. 6, 1921 |